United States Patent
Leith et al.

(10) Patent No.: US 7,038,514 B2
(45) Date of Patent: May 2, 2006

(54) STARTUP CIRCUIT FOR A DC-DC CONVERTER

(75) Inventors: James W. Leith, Seattle, WA (US); Gustavo J. Mehas, Mercer Island, WA (US)

(73) Assignee: Intersil Americas Inc., Milpitas, CA (US)

(*) Notice: Subject to any disclaimer, the term of this patent is extended or adjusted under 35 U.S.C. 154(b) by 64 days.

(21) Appl. No.: 10/775,560

(22) Filed: Feb. 10, 2004

(65) Prior Publication Data

US 2005/0088212 A1    Apr. 28, 2005

Related U.S. Application Data

(60) Provisional application No. 60/514,964, filed on Oct. 28, 2003.

(51) Int. Cl.
*G05F 1/46* (2006.01)
*H03M 3/156* (2006.01)
*H03K 3/0233* (2006.01)

(52) U.S. Cl. .................. 327/198; 327/540; 323/901

(58) Field of Classification Search ................ 327/131, 327/143, 198, 540; 323/282, 283, 351, 901; 363/49
See application file for complete search history.

(56) References Cited

U.S. PATENT DOCUMENTS

| | | | |
|---|---|---|---|
| 5,502,410 A | * | 3/1996 | Dunn et al. ............... 327/140 |
| 6,316,926 B1 | | 11/2001 | Savo et al. |
| 6,448,752 B1 | * | 9/2002 | Umemoto ................... 323/288 |
| 6,552,517 B1 | | 4/2003 | Ribellino et al. |
| 6,661,216 B1 | | 12/2003 | Grant et al. |
| 2005/0194951 A1 | * | 9/2005 | Mehas et al. ............... 323/282 |

FOREIGN PATENT DOCUMENTS

EP    0 532 263 A    3/1993

OTHER PUBLICATIONS

PCT Notification of Transmittal of the International Search Report or the Declaration, dated Apr. 12, 2005, 3 pages.

* cited by examiner

*Primary Examiner*—Kenneth B. Wells
*Assistant Examiner*—Terry L. Englund
(74) *Attorney, Agent, or Firm*—Gary R. Stanford

(57) ABSTRACT

A startup circuit for a power converter including an amplifier circuit, a comparator, and startup logic. The power converter includes an error amplifier that compares an output sense signal with a startup reference signal and that provides a compensation signal. The amplifier circuit charges the startup reference signal to a predetermined reference level based on a second reference signal in response to a start signal. The comparator determines when the compensation signal reaches a predetermined ramp level and asserts a startup complete signal indicative thereof. The startup logic provides the start signal and provides an output enable signal in response to the startup complete signal. The output enable signal enables output switching to initiate normal regulation operation of the output voltage. In one embodiment, the predetermined ramp level is approximately the center voltage of a sawtooth regulation waveform used for PWM modulation.

22 Claims, 3 Drawing Sheets

STARTUP CIRCUIT FOR A DC-DC CONVERTER

CROSS-REFERENCE TO RELATED APPLICATIONS

This application claims the benefit of U.S. Provisional Application No. 60/514,964 filed on Oct. 28, 2003, which is herein incorporated by reference for all intents and purposes.

BACKGROUND OF THE INVENTION

1. Field of the Invention

The present invention relates to PWM power regulators and/or DC-DC converters, and more particularly to a PWM switching DC-DC converter methodology for startup into a pre-charged load.

2. Description of the Related Art

The typical startup sequence of a pulse-width modulation (PWM) DC-DC converter is to ramp the non-inverting or positive "+" input of a feedback control error amplifier from zero (0) Volts (V) to a target VREF setpoint voltage level. The error amplifier is part of a feedback control loop which regulates an output voltage VOUT by comparing the reference voltage, VREF, with a fed back sensed portion of VOUT. In an exemplary buck-type converter, the PWM control circuitry drives the load through a switching device pair including an upper switching device and a lower switching device. The upper and lower switching devices are typically implemented as a MOSFET pair. If the converter is started into a precharged load, such as when VOUT is already charged, there can be large potentially damaging transient currents because VREF is less than the fed back sensed portion of VOUT. In particular, since the feedback loop attempts to regulate VOUT based on the voltage level at the input of the error amplifier, which is ramping up towards VREF, the "pull down" output switching device (e.g., the lower MOSFET of switching MOSFET pair) can be turned on long enough to exceed its thermal limit.

SUMMARY OF THE INVENTION

A startup circuit for a power converter according to an embodiment of the present invention includes an amplifier circuit, a comparator, and startup logic. The power converter includes an error amplifier that compares an output sense signal with a startup reference signal and that provides a compensation signal indicative thereof. In a typical configuration, the compensation signal is used by PWM logic to develop an PWM signal used to control output switching. The amplifier circuit charges the startup reference signal to a predetermined reference level based on a second reference signal in response to a start signal. The comparator determines when the compensation signal reaches a predetermined ramp level and asserts a startup complete signal indicative thereof. The startup logic provides the start signal and provides an output enable signal in response to the startup complete signal. The output enable signal enables output switching to initiate normal regulation operation of the output voltage.

In one embodiment, the predetermined ramp level is approximately the center voltage of a sawtooth regulation waveform used for PWM modulation. The amplifier circuit may include an amplifier and a capacitor. In this case, the amplifier has an input receiving the second reference signal and an output coupled to the capacitor. The amplifier charges the capacitor in response to the start signal to charge ramp up the startup reference signal. In a more specific configuration, the amplifier is an operational transconductance amplifier (OTA).

One or more switches may be used to control operative states of the amplifier if the startup circuit. In one embodiment, a first switch is coupled across the capacitor, where the start signal opens the first switch to enable charging of the capacitor. Furthermore, a second switch may be provided and coupled in a feedback path of the amplifier. The second switch is initially open to place the amplifier in an open loop configuration, and closed to switch the amplifier into a closed loop configuration to maintain the startup reference signal based on the second reference signal. In a more specific configuration, the amplifier includes a first input receiving the second reference signal and a second input coupled to the second switch. A third switch is provided and coupled between the second input of the amplifier and ground, where the third switch is closed during startup operations and while the amplifier is charging the capacitor and where the third switch is opened when the second switch is closed. A digital state machine or the like may be used to control the switches.

A controller for a power converter includes an error amplifier, gate control logic and a startup circuit. The error amplifier includes a first input receiving an output sense signal, a second input receiving a startup reference signal and an output that provides a compensation signal. The gate control logic controls output switching of the power converter and disables output switching based on an output enable signal. The startup circuit controls initiation of the error amplifier including charging of the startup reference signal, and disables output switching until the compensation signal achieves an operative level.

The startup circuit may include a comparator having inputs for comparing the compensation signal with a predetermined ramp level based on a PWM triangular waveform and an output for providing a startup complete signal. In one embodiment, the predetermined ramp level is a voltage level placed at approximately the center of the triangular waveform. The startup circuit may further include a capacitor and an amplifier. In this configuration, the capacitor is coupled to the second input of the amplifier and develops the startup reference signal. The amplifier operates in a first state to charge the capacitor and operates in a second state to regulate the startup reference signal based on the voltage reference signal.

The startup circuit may further include a plurality of switches and a digital state machine in a similar manner as previously described.

A method of startup protection for a DC-DC converter according to an embodiment of the present invention includes disabling output switching of the DC-DC converter, ramping up voltage of a reference input of an error amplifier based on a reference signal, providing, by the error amplifier, a compensation signal based on the reference input and a feedback portion of an output of the DC-DC converter, and enabling output switching of the DC-DC converter when the compensation signal reaches a predetermined regulation level. The method may include charging a capacitor by an OTA. The method may further include providing the reference signal to an input of the OTA, operating the OTA in an open loop state to charge the capacitor, and operating the OTA in a closed loop state when regulation is achieved to maintain voltage of the capacitor based on the reference signal.

BRIEF DESCRIPTION OF THE DRAWING(S)

The benefits, features, and advantages of the present invention will become better understood with regard to the following description and accompanying drawings in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
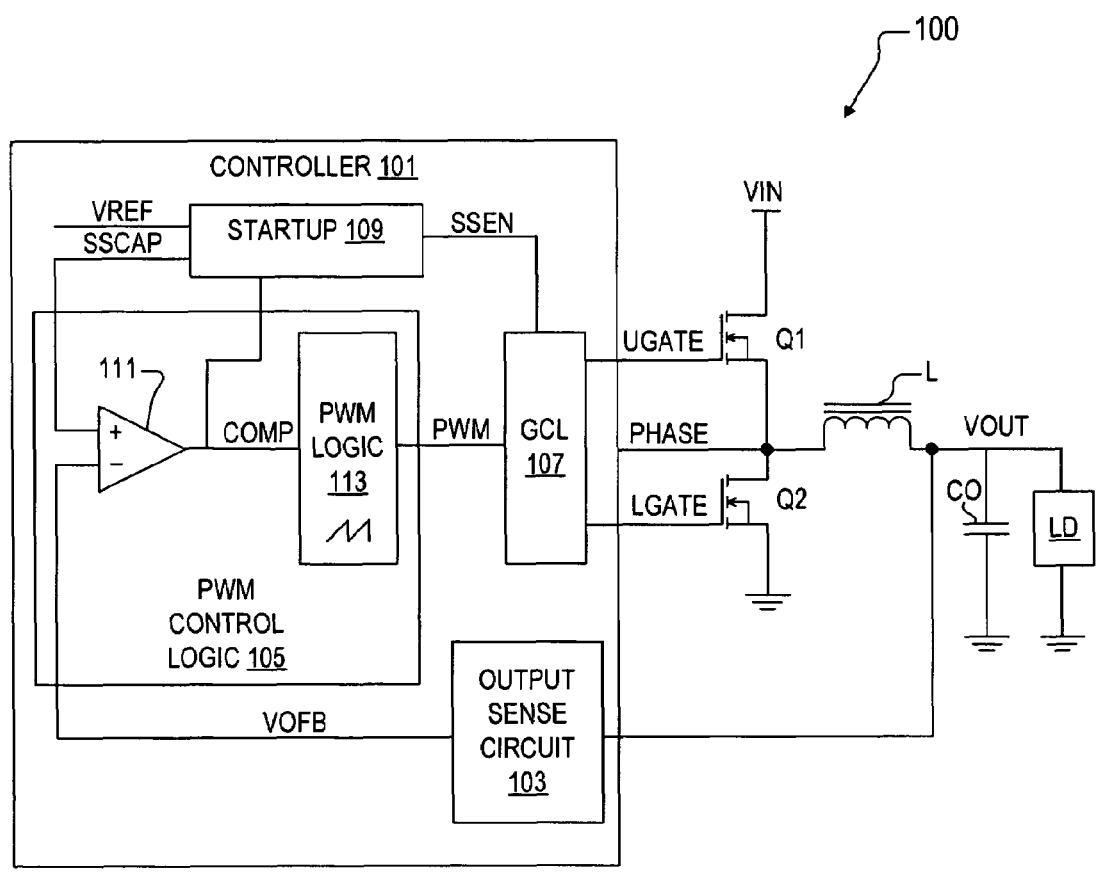
FIG. 1 is a simplified schematic and block diagram of an exemplary DC-DC converter including a startup circuit according to an embodiment of the present invention.

FIG. 1 is a simplified schematic and block diagram of an exemplary DC-DC converter 100 including a startup circuit 109 implemented according to an embodiment of the present invention. The DC-DC converter 100 is shown as a buck-type converter for purposes of illustration, although it is understood that the present invention is equally applicable to other types of power converters. A pair of switches Q1 and Q2 are coupled in series between an input source voltage VIN and ground. In the embodiment shown, the switches Q1 and Q2 are implemented as N-channel metal-oxide semiconductor, field-effect transistors (MOSFETs), although other types of switches are contemplated including semiconductor switches suitable for integrated circuit (IC) fabrication. The upper switch Q1 has its drain coupled to VIN, its gate receiving an upper gate control signal UGATE, and its source coupled to the drain of the lower switch Q2 at a PHASE node. The lower switch Q2 receives a lower gate control signal LGATE at its gate and has its source coupled to ground. The PHASE node is coupled through an output inductor L to an output node that develops an output signal VOUT. The VOUT signal is applied to a load LD and an output capacitor CO both referenced to ground. The VOUT signal is fed back to an output sense circuit 103 of a controller 101, where the controller 101 outputs the UGATE and LGATE signals to control operation of the switches Q1 and Q2. The PHASE node is also provided to the controller 101 for various purposes, including overcurrent detection.

The controller 101 includes the output sense circuit 103, PWM control logic 105, gate control logic (GCL) 107 and the startup circuit 109. The output sense circuit 103 provides a sensed portion of the VOUT signal as a feedback signal VOFB, which is provided to the inverting input of an error amplifier 111 within the PWM control logic 105. In typical configurations, the error amplifier 111 senses VOUT via the VOFB signal and compares VOFB with a reference voltage VREF to control a compensation signal COMP provided at its output to PWM logic 113. The PWM logic 113 includes an oscillator or the like (not shown) that generates a reference waveform (e.g., ramp, sawtooth, or triangular signal or the like) and a PWM comparator (not shown) which compares the reference waveform with the COMP signal to generate a PWM signal provided to the GCL 107. Based on the PWM signal, the GCL 107 asserts the UGATE signal high to turn on the switch Q1 and asserts the LGATE signal low to turn off the switch Q2 to couple VIN through the output inductor L to drive the voltage level of VOUT. The GCL 107 then asserts the UGATE signal low and the LGATE signal high to turn off Q1 and to turn on Q2.

A typical startup sequence is to ramp the non-inverting input of the error amplifier 111, shown as a signal SSCAP, from zero to the VREF set point voltage level. If VOUT is already pre-charged, such as by the load LD or by other DC-DC converters (e.g., redundant converters or the like), then the feedback loop within the controller 101 causes the GCL 107 to activate the lower switch Q2 for a substantial period of time in an attempt to reduce VOUT since VOFB is significantly greater than SSCAP. Thus, the switch Q2 is coupled between ground and the pre-charged VOUT signal through the inductor L for a sufficiently long enough period of time to potentially exceed its thermal limit. The startup circuit 109 is provided to prevent this undesirable situation. The startup circuit 109 provides a start-up enable signal SSEN to the GCL 107 to effectively enable and disable output switching, as further described below. The VREF signal is provided to the startup circuit 109, which provides the startup reference signal SSCAP to the non-inverting input of the error amplifier 111. The COMP signal is also provided to the startup circuit 109, which monitors operation of the error amplifier 111 to determine when it is appropriate to assert the SSEN signal to enable output switching in order to reduce or otherwise eliminate the possibility of activating the switch Q2 for excessive periods of time.

The GCL 107 includes a pair of output drivers (not shown) that drive the gates of the switches Q1 and Q2 based on the PWM signal as known to those skilled in the art. Also, the GCL 107 typically includes shoot-through protection logic or the like that ensures that only one of the switches Q1 and Q2 is on at any given time. When the SSEN signal is asserted high, the GCL 107 operates as normal. When the SSEN signal is asserted low, the GCL 107 turns both of the switches Q1 and Q2 off to disable output switching. In one embodiment, for example, the GCL 107 disables both of the output drivers so that the UGATE and LGATE signals are both asserted low and remain low while the SSEN signal is asserted low. Internal and external embodiments of the GCL 107 are contemplated. An external gate drive IC, for example, may be configured with an enable input that receives the SSEN signal or a version thereof. In some embodiments, the GCL 107 tri-states its outputs in response to the SSEN signal going low, and a separate driver IC detects the tri-state condition and disables itself. The present invention is not limited to any specific embodiment or configuration of the GCL 107.

Figure 2:
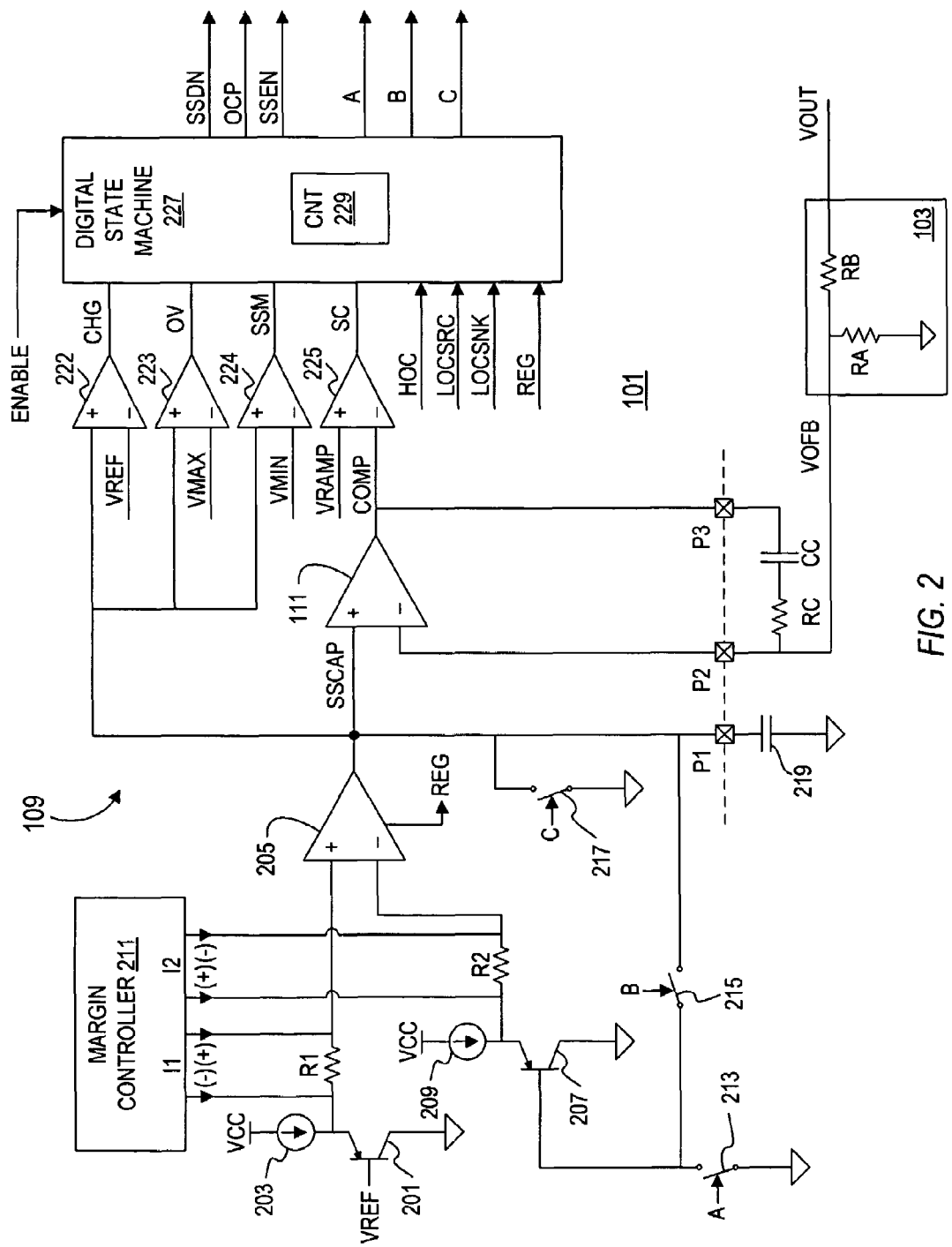
FIG. 2 is a more detailed schematic and block diagram of a portion of the controller of FIG. 1 including further detail of the startup circuit according to an exemplary embodiment of the present invention.

FIG. 2 is a more detailed schematic and block diagram of a portion of the controller 101 including further detail of the startup circuit 109 according to an exemplary embodiment of the present invention. The VREF signal is provided to the base of a PNP bipolar transistor 201, having its collector coupled to ground. A current source 203 is coupled between a source voltage VCC and the emitter of the transistor 201 for providing current to the transistor 201. The current source 203 and the transistor 201 collectively operate as a voltage follower, which develops approximately the voltage level of VREF at the emitter of the transistor 201. In one embodiment, VREF is an on-chip voltage reference of 0.6 Volts (V), although any other suitable voltage level is contemplated. The emitter of the transistor 201 is coupled to one end of a resistor R1, having its other end coupled to the non-inverting input of an operational transconductance amplifier (OTA) 205. Another PNP bipolar transistor 207 and current source 209 are coupled between VCC and ground in a similar manner and collectively operate as another voltage follower, where the emitter of the transistor 207 is coupled to one end of another resistor R2. The other end of the resistor R2 is coupled to the inverting input of the OTA 205. The resistance values of R1 and R2 may be any suitable values for implementing margin control of the OTA 205. In one embodiment, these resistors are substantially equal and related to a master margin resistor value.

A margin controller 211 applies a first current I1 through resistor R1 and a second current I2 through resistor R2 for enabling a user to program a specific offset to the output voltage VOUT of the DC-DC converter 100. The margin controller 211 is not further described. The OTA 205 incorporates a comparator or the like (not shown), which provides a regulation signal REG when the inverting and non-inverting inputs of the OTA 205 are substantially equal. The REG signal is asserted high generally indicating when the voltage levels of the VREF and SSCAP signals are sufficiently close, although the difference between the SSCAP and VREF signals is potentially modified by the margin controller 211. If REG is asserted high or "true" and margin control is applied to adjust VOUT, REG goes false while SSCAP slews to the new reference value.

A first single-pole, single throw (SPST) switch 213 is coupled between the base of the transistor 207 and ground and is controlled by a signal A. When A is asserted high, switch 213 is turned on (or closed) to couple the base of transistor 207 to ground; when A is asserted low, switch 213 is turned off (or opened) to disconnect the base of transistor 207 from ground. Although positive logic is shown and described for all digital signals, negative logic is contemplated as well. A second switch 215 is coupled in a feedback path of the OTA 205 between the output of the OTA 205 and the base of the transistor 207 and controlled by a signal B. A third switch 217 is coupled between the output of OTA 205 and ground and is controlled by a signal C. The switches 215 and 217 operate in a similar manner as the switch 113, such that when B is asserted high, switch 215 is turned on (closed) coupling the output of OTA 205 to the base of the transistor 207, and when C is asserted high, switch 217 is turned on (closed) coupling the output of OTA 205 to ground. A soft-start capacitor 219 is coupled between the output of the OTA 205 and ground. The C signal is otherwise referred to as a start signal that discharges the capacitor 219 when asserted high and that initiates charging of the capacitor 219 when asserted low.

The SSCAP signal is the reference voltage developed on the capacitor 219 at the output of the OTA 205. In the configuration shown, the controller 101 is configured on an IC or chip with multiple external pins including pins P1, P2 and P3. The pin P1 enables external selection and connection of the soft-start capacitor 219 to the output of the OTA 205 for developing the SSCAP signal. In this manner, a user selects the value of the capacitor 219 to control the ramp up of the soft-start voltage SSCAP based on VREF to control the rate of startup operations. The switch 217 is used to temporarily ground the output of the OTA 205 and to discharge the capacitor 219 when the C signal is asserted high, and to enable the capacitor 219 to charge when the C signal is asserted low.

The output of the OTA 205 is coupled to the non-inverting input of the error amplifier 111. The inverting input and the output of the error amplifier 111 are coupled to external pins P2 and P3, respectively. A user selects and couples a compensation resistor RC and a compensation capacitor CC in series between pins P2 and P3 to provide compensation for the error amplifier 111 as known to those skilled in the art. The user also couples the output sense circuit 103 between pin P2 and VOUT to enable feedback sensing of the VOUT signal. In the embodiment shown, the output sense circuit 103 includes a first resistor RA coupled between pin P2 and ground and a second resistor RB between pin P2 and the PWM DC-DC converter output voltage VOUT. In this case, the resistors RA and RB form a voltage divider that develops the VOFB signal as a portion of the VOUT signal, where the VOFB signal is provided to the inverting input of the error amplifier 111. The resistive values of RA and RB are selected by the user to divide the voltage of VOUT to a suitable voltage level at pin P2 to enable the controller 101 to control or otherwise regulate the voltage level of VOUT to a selected level based on VREF. In the configuration shown, the resistance values of RA and RB are selected to develop a voltage level at pin P2 substantially equal to VREF (e.g., 0.6 V) when VOUT is at the target voltage level.

The output of the error amplifier 111 generates the COMP signal, which is provided to the inverting input of a comparator 225. The non-inverting input of the comparator 225 receives a signal VRAMP, and the output of the comparator 225 generates a soft-start complete signal SC. The voltage level of the VRAMP signal is selected to be representative of the PWM ramp voltage of the PWM logic 113. In the configuration illustrated, the VRAMP signal is a voltage level placed at approximately the center of the ramp voltage, which has a maximum ramp amplitude voltage VR_HI and a minimum ramp amplitude voltage VR_LO. In this manner, VRAMP is the middle or average of the maximum and minimum amplitudes of the PWM ramp voltage or VRAMP=(VR_HI+VR_LO)/2, where the forward slash "/" denotes division. During startup conditions, the SSCAP signal is ramped up from zero to a level based on VREF as further described below. If VOUT is pre-charged high, then VOFB is initially greater than SSCAP so that the COMP signal is asserted low and less than VRAMP. Thus, the SC signal is initially high. When the COMP signal eventually goes high reaching or otherwise exceeding the voltage level of VRAMP, the SC signal is asserted low indicating the end of the soft-start period.

The SSCAP signal is provided to the non-inverting inputs of additional comparators 222, 223 and 224. The inverting inputs of comparators 223 and 224 receive signals VMAX and VMIN, respectively. In one embodiment, the VMAX signal has a fixed voltage level sufficiently close to the voltage source VCC, such as VCC−0.6 V. The comparator 223 asserts an over-voltage signal OV in the event that the SSCAP signal exceeds the voltage level of VMAX indicating an over-voltage condition. The SSCAP signal is intended to ramp up from zero to VRAMP and then up or down to VREF and should not approach VMAX during normal operation. The signal VMIN is a predetermined minimum voltage value, such as 50 millivolts (mV). The comparator 224 asserts a signal SSM high when SSCAP is greater than VMIN and asserts the SSM signal low when SSCAP falls below VMIN. The SSM signal is used to determine when the voltage of the capacitor 219 is sufficiently discharged. The comparator 222 asserts a signal CHG high while SSCAP is greater than a suitable intermediate voltage level, such as VREF in the embodiment shown, and asserts the CHG signal low when SSCAP falls below VREF. The CHG signal is used to determine when the voltage of the capacitor 219 is sufficiently charged for timing purposes, as described further below.

The CHG, OV, SSM, and SC signals are all provided to a digital state machine 227. The digital state machine 227 asserts the SSEN signal in response to transition of the SC signal low to enable the GCL 107 to control the switches Q1 and Q2 to develop the VOUT signal. The digital state machine 227 also receives several over-current (OC) signals, including a high-side OC signal HOC, a low-side OC source signal LOCSRC, and a low-side OC sink signal LOCSNK. The HOC signal indicates an over-current situation through the high-side switch Q1. The LOCSRC signal indicates that the voltage of the low-side switch Q2 has gone too negative. The LOCSNK signal indicates that the PHASE node has gone too high in the positive direction. The digital state machine 227 asserts a signal (or sets a flag) OCP whenever any of the over-current signals HOC, LOCSRC or LOCSNKC are asserted indicating an over-current condition.

The digital state machine 227 receives an ENABLE signal indicating that power-on reset (POR) condition is completed and that the controller 101 is enabled by the user (via an external pin or the like). The digital state machine 227 asserts the A, B and C signals to control the switches 213, 215 and 217 respectively. The switches 213 and 215 control the OTA 205 between multiple operative states including open and closed loop configurations. The switch 213 is closed and the switch 215 is open to place the OTA 205 in an open loop configuration. While the OTA 205 is in the open loop configuration, the switch 217 is closed to discharge the capacitor 219 and opened to enable charging of the capacitor 219. The switch 213 is opened and the switch 215 closed to place the OTA 205 in the closed loop configuration to regulate the SSCAP signal based on VREF. In the closed loop configuration, the switch 217 is opened to enable the capacitor 219 to retain its charge.

The digital state machine 227 receives the REG signal and asserts a corresponding soft-start done signal SSDN when the SSCAP signal becomes substantially equal to VREF indicating normal voltage regulation operation. As previously noted, however, the margin controller 211 is used to adjust the value of SSCAP relative to VREF to allow adjustment of VOUT. The signal REG more precisely indicates regulation of the OTA 205 when its inputs are substantially equal. The digital state machine 227 includes a counter 229 storing a count value (CNT) used for defining a wait period to re-start operations after an over-current condition is detected and corrected, as further described below.

Figure 3:
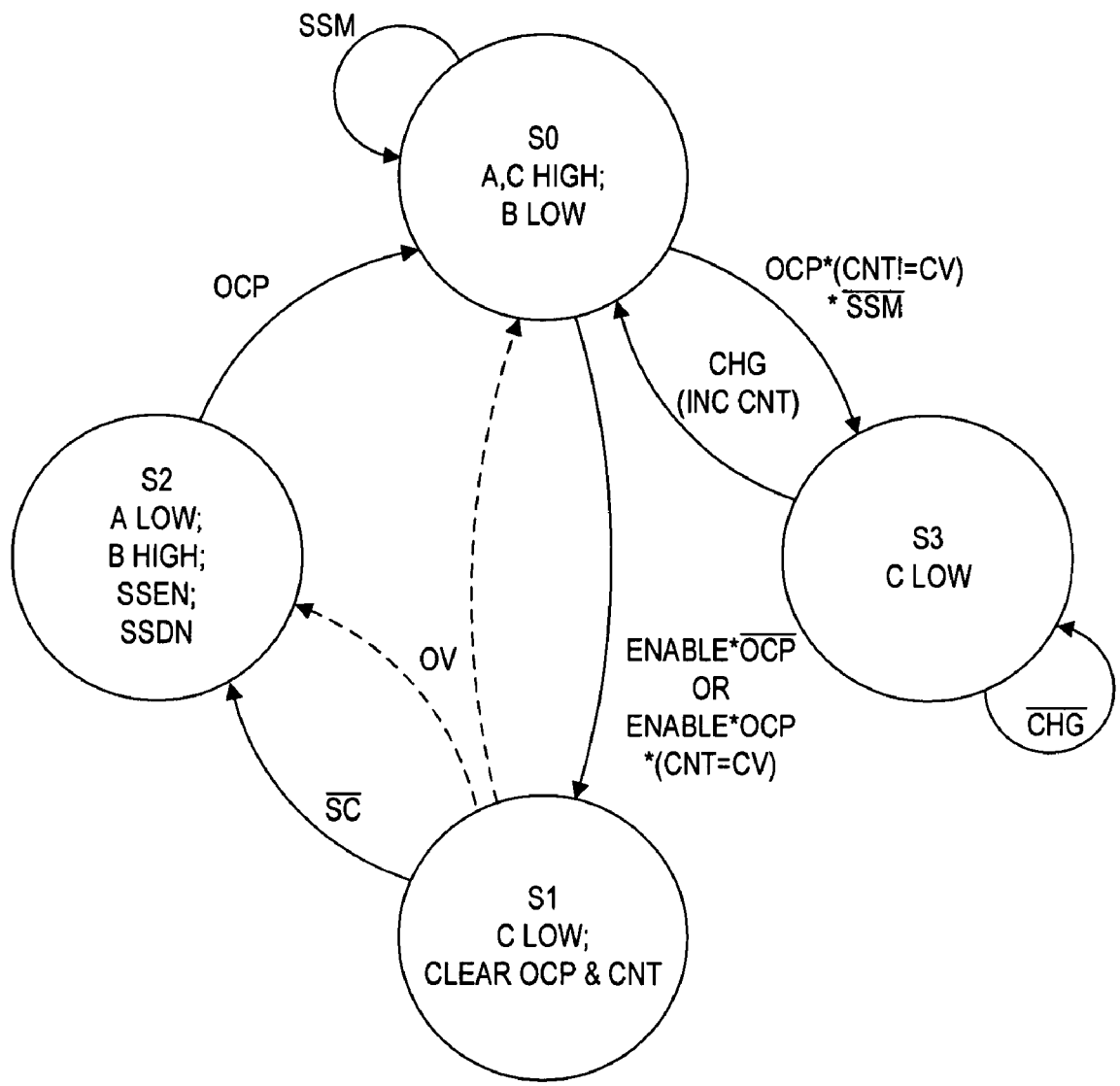
FIG. 3 is a state diagram illustrating operation of the digital state machine of FIG. 2.

FIG. 3 is a simplified state diagram illustrating operation of the digital state machine 227. Four states are defined including a first reset or initial and over-current state S0, a second intermediate state S1, a third normal operating state S2, and a fourth wait period state S3. In the state diagram, a bar over a signal name denotes that the signal is asserted low or otherwise at a logic low level. The A, B and C signals are shown as being "HIGH" when asserted high for turning the corresponding switch on and "LOW" when asserted low for turning the corresponding switch off. Operation begins in state S0 and stays in state S0 while the voltage of the SSCAP signal is greater than VMIN as indicated by the SSM signal. In state S0, the signals A and C are asserted high and the B signal is asserted low. In this manner, the switch 217 is turned on (closed) to discharge the capacitor 219 and the switch 215 is turned off (opened) so that the OTA 205 is initially in the open loop configuration.

After SSCAP falls below VMIN and when the ENABLE signal is asserted and when OCP is not asserted (e.g., after initialization and there is no over-current condition), operation proceeds to state S1 in which the C signal is asserted low to turn off switch 217. This enables the OTA 205, still configured in open loop, to begin charging the soft-start capacitor 219 so that the SSCAP signal begins to ramp up or otherwise increase. In state S1, the OCP signal is cleared if previously set and the CNT value of the counter 229 is also cleared or set to zero. The digital state machine 227 stays in state S1 until the COMP signal becomes equal to VRAMP as indicated by the SC signal being asserted low or if an over-voltage condition occurs as indicated by the OV signal being asserted high. At least two options are illustrated if and when the OV signal is asserted, in which case operation transitions either to state S2 in one option or back to state S0 in another option. The over-voltage condition is not further described as not particularly relevant to the invention. Otherwise, when COMP becomes substantially equal to VRAMP (or increases above VRAMP), the SC signal is asserted low and operation proceeds to state S2. In state S2, the A signal is asserted low to turn off switch 213 and signal B is asserted high to turn on switch 215 to place the OTA 205 in the closed loop configuration. Switch 217 is still off so that the capacitor 219 retains its charge. The OTA 205, when in the closed loop configuration, operates to drive the SSCAP signal to be substantially equal to VREF.

Upon entering state S2, the SSEN signal is asserted to enable the GCL 107 to begin controlling the switches Q1 and Q2 to drive current to the load LD and/or otherwise regulate the VOUT signal. Once in state S2, the OTA 205 drives the SSCAP signal up or down towards the setpoint voltage of VREF. In the steady-state condition, the inputs of the OTA 205 become substantially equal and the OTA 205 asserts the REG signal. The digital state machine 227 receives the REG signal and asserts the SSDN signal indicating that the soft-start period is over and the loop centered around the error amplifier 111 is in control. Operation remains in state S2 until power-down or if an over-current situation is detected upon assertion of the OCP signal.

If and when the OCP signal is asserted while in state S2, operation returns to state S0 in which the A and C signals are once again asserted high to turn switches 213 and 217 back on and the B signal is pulled low to turn off switch 215. The capacitor 219 is again discharged and operation remains in state S0 until the SSCAP falls below VMIN. The SSEN signal is negated so that the GCL 107 once again disables switching of Q1 and Q2. Once set, the OCP signal (or flag) remains asserted until reset in state S1. The CNT value of the counter 229 is initially zero. After SSCAP falls below VMIN, while OCP is set and while the CNT value of the counter 229 is not equal (where "!=" denotes inequality) to a predetermined count value CV (e.g., CV =3 or any other suitable count value), operation proceeds to state S3 in which the C signal is asserted low to turn off the switch 217. The OTA 205, in the open loop configuration, begins charging the capacitor 219 again and operation remains in state S3 while the SSCAP signal is less than a predetermined voltage level, such as VREF, as indicated by the CHG signal being low. When the voltage of SSCAP becomes substantially equal to VREF as indicated by assertion of the CHG signal, operation returns to state S0 and the value of the CNT count of the counter 229 is incremented. Operation toggles between states S0 and S3 in this manner multiple times until the CNT value of the counter 229 reaches the predetermined count value CV. After SSCAP falls below VMIN, if the ENABLE signal is asserted, the OCP flag is set and if the count value equals the predetermined count value CV, operation proceeds to state S1, where the OCP signal is negated (or the OCP flag is cleared) and the CNT value of the counter 229 is also cleared. The counter 229 and the toggling between states S0 and S3 establish a start-up wait period defined as CV times the time it takes for SSCAP to charge to VRLEF. In the embodiment shown, the OTA 205 provides a current of approximately 30 microamperes (μA) and the size of the capacitor 219 is selected by the user.

It is appreciated that a startup circuit according to an embodiment of the present invention delays output switching until the output of the error amplifier of a PWM DC-DC power converter is sufficiently high to prevent the controller from driving the low-side switch on for an excessive amount of time when the output is already high or otherwise pre-charged. In one embodiment, output switching is initiated when the error amplifier output is approximately centered in the middle of the ramp voltage of the PWM modulator. This implies that the non-inverting input to the error amplifier is sufficiently close to that of the inverting or negative "−" input so that output switching may commence avoiding the potentially damaging transient currents. After output switching is initiated, the non-inverting input of the error amplifier is ramped to the VREF setpoint.

In the embodiment illustrated herein, the operational transconductance amplifier (OTA) with an external soft-start capacitor at its output is employed to ramp the non-inverting input of the error amplifier from zero until the error amplifier output reaches a voltage level that is in the middle of the PWM's modulator ramp. Thus, output switching is enabled when the non-inverting error amplifier input is sufficiently close to its inverting input, which receives the fed back portion of VOUT. The inverting input of the error amplifier is related to VOUT, so that when the error amplifier inputs are approximately equal, a voltage related to the precharged output level has been stored on the soft-start capacitor. Also, since the error amplifier inputs are close to each other, neither of the output switches can stay on for multiple switching periods. The OTA is then configured to ramp either up or down to the VREF setpoint. Since the transition to the reference setpoint is controlled by the OTA and the soft-start capacitor, or V=(30 uA/C)*T, it can be programmed slowly, so as to not cause output voltage or current transients.

It is appreciated that many variations are possible and many contemplated. For example, a fourth SPST switch (not shown) may be added between pins P1 and P2 (or between the VOFB and SSCAP) with an additional control signal output from the digital state machine 227. This additional switch is used to charge SSCAP to the voltage of VOFB, where the state machine stays in state S0 until SSCAP becomes equal to VOFB and then transitions to state S1. The OTA 205 still ramps up until COMP is equal to VRAMP. In this case, the function of the switch 217 is modified and only used during the over-current condition to discharge the capacitor 219.

Although the present invention has been described in considerable detail with reference to certain preferred versions thereof, other versions and variations are possible and contemplated. For example, particular voltage or current levels and component values and device types are arbitrary and determined in accordance with the particular implementation. Positive or negative logic is contemplated. Digital and analog implementations and any combination thereof are contemplated. Those skilled in the art should appreciate that they can readily use the disclosed conception and specific embodiments as a basis for designing or modifying other structures for providing out the same purposes of the present invention without departing from the spirit and scope of the invention as defined by the appended claims.

The invention claimed is:

1. A startup circuit for a power converter, the power converter including an error amplifier that compares an output sense signal with a startup reference signal and that provides a compensation signal indicative thereof, the startup circuit comprising:
   an amplifier circuit that charges the startup reference signal to a predetermined reference level based on a second reference signal in response to a start signal;
   a comparator that determines when the compensation signal reaches a predetermined ramp level and that asserts a startup complete signal indicative thereof; and
   startup logic that provides said start signal and that provides an output enable signal in response to said startup complete signal.

2. The startup circuit of claim 1, wherein said predetermined ramp level is approximately the center voltage of a sawtooth regulation waveform used for PWM modulation.

3. The startup circuit of claim 1, wherein said amplifier circuit comprises:
   an amplifier, having an input receiving said second reference signal, and an output; and
   a capacitor coupled to said output of said amplifier;
   wherein said amplifier charges said capacitor in response to said start signal to charge said startup reference signal.

4. The startup circuit of claim 3, further comprising a first switch coupled across said capacitor, wherein said start signal opens said first switch to enable charging of said capacitor.

5. The startup circuit of claim 4, further comprising:
   a second switch coupled in a feedback path of said amplifier; and
   wherein said second switch is initially open to place said amplifier in an open loop configuration, and wherein said second switch is closed to switch said amplifier into a closed loop configuration to maintain said startup reference signal based on said second reference signal.

6. The startup circuit of claim 5, further comprising:
   said amplifier having a first input receiving said second reference signal and a second input coupled to said second switch; and
   a third switch coupled between said second input of said amplifier and ground, where in said third switch is closed during startup operations and while said amplifier is charging said capacitor and wherein said third switch is opened when said second switch is closed.

7. The startup circuit of claim 6, wherein said startup logic comprises a digital state machine that controls said first, second and third switches to startup said power converter.

8. The startup circuit of claim 6, wherein said amplifier comprises an operational transconductance amplifier.

9. The startup circuit of claim 6, further comprising:
   a first voltage follower having an input receiving said second reference signal and an output coupled to said first input of said amplifier; and
   a second voltage follower having an input coupled to said second and third switches and an output coupled to said second input of said amplifier.

10. The startup circuit of claim 9, further comprising:
    a first resistor coupled between said output of said first voltage follower and said first input of said amplifier;

a second resistor coupled between said output of said second voltage follower and said second input of said amplifier; and a margin controller coupled to adjust current through said first and second resistors.

11. A controller for a power converter, comprising:

an error amplifier having a first input receiving an output sense signal, a second input receiving a startup reference signal and an output that provides a compensation signal;

a comparator having inputs for comparing said compensation signal with a predetermined ramp level and an output for providing a startup complete signal;

gate control logic that controls output switching of said power converter and that disables output switching when an output enable signal is negated and that enables output switching when said output enable signal is asserted; and a startup circuit, coupled to said error amplifier and providing said output enable signal, that controls initiation of said error amplifier including charging of said startup reference signal and that negates said output enable signal until said startup complete signal is provided.

12. The controller of claim 11, wherein said predetermined ramp level is based on a PWM triangular waveform and wherein said startup complete signal is provided when said compensation signal achieves an operative level.

13. The controller of claim 12, wherein said predetermined ramp level is a voltage level placed at approximately the center of said triangular waveform.

14. The controller of claim 11, wherein said startup circuit comprises:

a capacitor, coupled to said second input of said error amplifier, that develops said startup reference signal; and an amplifier, having an input receiving a voltage reference signal and an output coupled to said capacitor, wherein said amplifier operates in a first state to charge said capacitor and operates in a second state to regulate said startup reference signal based on said voltage reference signal.

15. The controller of claim 14, wherein said startup circuit further comprises:

a plurality of switches coupled to said amplifier and said capacitor; and a digital state machine that controls said plurality of switches to determine operative states, including said first and second states, of said amplifier.

16. The controller of claim 15, wherein:

said amplifier has a first input receiving said voltage reference signal and a second input;

wherein said capacitor is coupled between said output of said amplifier and ground; and wherein said plurality of switches comprises:

a first switch coupled across said capacitor;

a second switch coupled between said second input and said output of said amplifier; and a third switch coupled between said second input of said amplifier and ground.

17. The controller of claim 16, wherein said digital state machine opens said first and second switches and closes said third switch for said first state, and wherein said digital state machine closes said second switch and opens said third switch for said second state.

18. The controller of claim 17, wherein said digital state machine closes said first and third switches and opens said second switch for a third state.

19. The controller of claim 14, wherein said amplifier comprises an operational transconductance amplifier.

20. A method of startup protection for a DC-DC converter, comprising:

disabling output switching of the DC-DC converter;

ramping up voltage of a reference input of an error amplifier based on a reference signal;

providing, by the error amplifier, a compensation signal based on the reference input and a feedback portion of an output of the DC-DC converter;

comparing the compensation signal with a predetermined ramp level and providing a startup complete signal indicative thereof; and enabling the output switching of the DC-DC converter when the startup complete signal is provided.

21. The method of claim 20, wherein said ramping up voltage of the reference input of the error amplifier comprises charging a capacitor by an operational transconductance amplifier (OTA).

22. The method of claim 21, further comprising:

providing the reference signal to an input of the OTA;

operating the OTA in an open loop state to charge the capacitor; and operating the OTA in a closed loop state when regulation is achieved to maintain voltage of the capacitor based on the reference signal.

* * * * *